(12) United States Patent
Clegg

(10) Patent No.: US 7,055,755 B2
(45) Date of Patent: Jun. 6, 2006

(54) ILLUMINATED BADGE

(76) Inventor: Tim Clegg, 19220 S. Normandie Ave., Torrance, CA (US) 90502-1011

( * ) Notice: Subject to any disclaimer, the term of this patent is extended or adjusted under 35 U.S.C. 154(b) by 36 days.

(21) Appl. No.: 10/798,683

(22) Filed: Mar. 11, 2004

(65) Prior Publication Data

US 2005/0199733 A1    Sep. 15, 2005

(51) Int. Cl.
*G06K 19/06* (2006.01)
(52) U.S. Cl. ........................ 235/492; 235/375
(58) Field of Classification Search .............. 235/380, 235/382, 486, 487, 375, 492; 40/1.5, 124.01, 40/124.02, 124.04, 1, 24.09, 124.14; 362/103, 362/190–194
See application file for complete search history.

(56) References Cited

U.S. PATENT DOCUMENTS

| | | | | |
|---|---|---|---|---|
| 4,965,705 A | * | 10/1990 | Lin | 362/103 |
| 5,010,665 A | * | 4/1991 | Clinkscales | 40/1.5 |
| 5,755,506 A | * | 5/1998 | Ray et al. | 362/103 |
| 5,843,595 A | * | 12/1998 | Kawakatsu | 429/97 |
| 6,282,819 B1 | * | 9/2001 | Gu | 40/124.03 |
| 6,684,544 B1 | * | 2/2004 | Buettell | 40/661.01 |
| 6,857,755 B1 | * | 2/2005 | Lewis | 362/104 |
| 2001/0052840 A1 | * | 12/2001 | Ghosh et al. | 340/7.43 |

FOREIGN PATENT DOCUMENTS

FR          2628949 A1  *  9/1989

* cited by examiner

*Primary Examiner*—Thien M. Le
(74) *Attorney, Agent, or Firm*—Clement Cheng

(57) ABSTRACT

An illuminated badge has a plastic transparent section having an LED illuminating the transparent section. A compartment section houses a controller circuit controlling LED illumination. A battery tray holds batteries and inserts into the compartment section from the side of the compartment section. A first magnet attaches to the compartment section, and a second magnet adheres to the first magnet allowing a user to attach the badge to clothing by inserting clothing between the first and second magnets.

6 Claims, 3 Drawing Sheets

ILLUMINATED BADGE

DISCUSSION OF RELATED ART

A wide variety of circumstances dictate the need to wear a badge. In the ordinary course of business, a wide variety of badges such as identity badges, name badges and security badges identify a wearer. Special functions such as trade shows and conventions often require badges. Also, employees of the same company can wear badges as a part of their uniform or to show unity and pride within the organization.

Disposable badges have been made of paper adhering to clothing. These stickers and labels often have a surface receiving writing. Other badges include plastic laminated badges for holding business cards. While the current badges are inexpensive and simple to produce, they can be ubiquitous and boring as well. The current badges are also easy to duplicate leading to security weaknesses. Holograms and special printing printed on current badges are often difficult to see at casual distances.

LIST OF ELEMENTS

Figure 1:
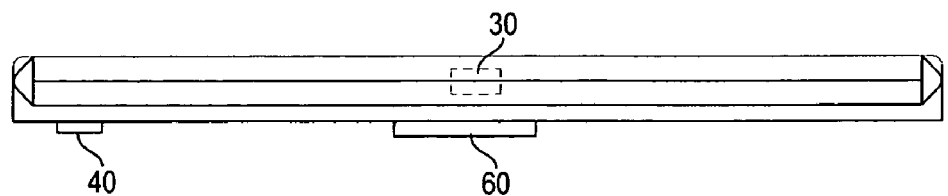
FIG. 1 is a bottom view of the badge.
Figure 2:
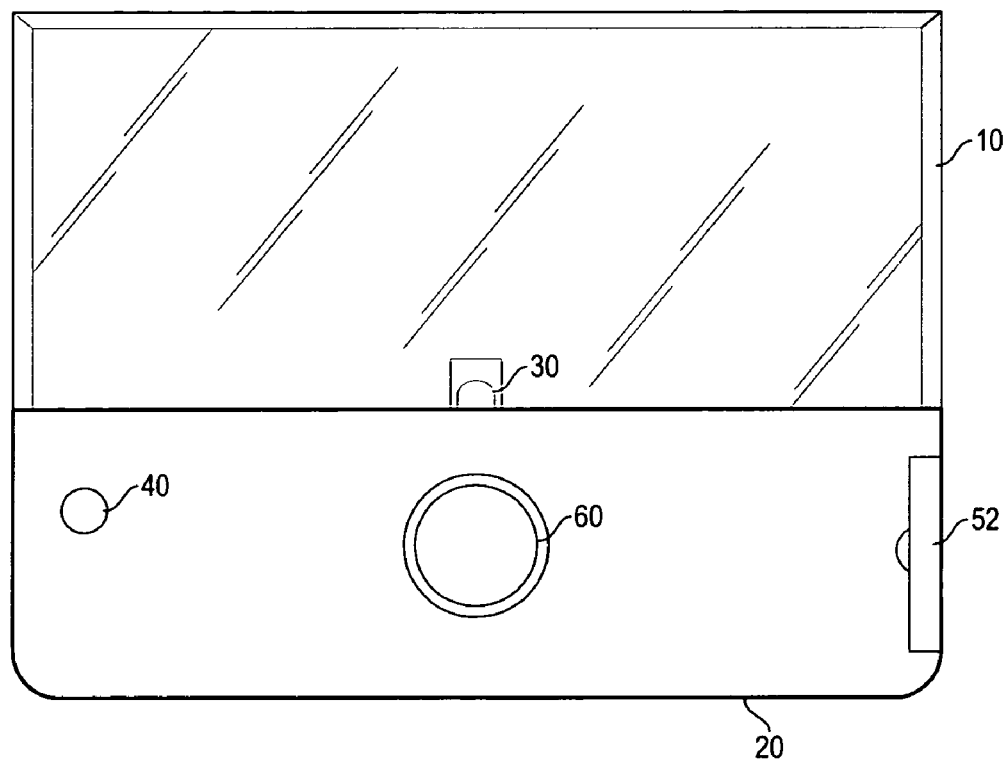
FIG. 2 is a rear view of the badge.
Figure 3:
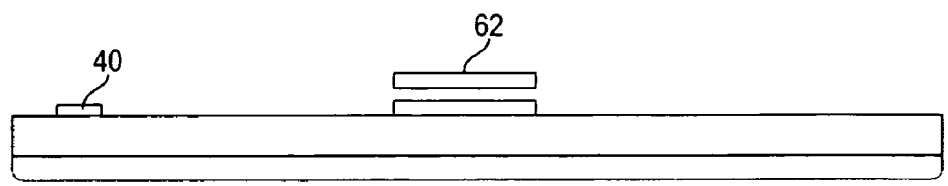
FIG. 3 is a top view of the badge.
Figure 4:
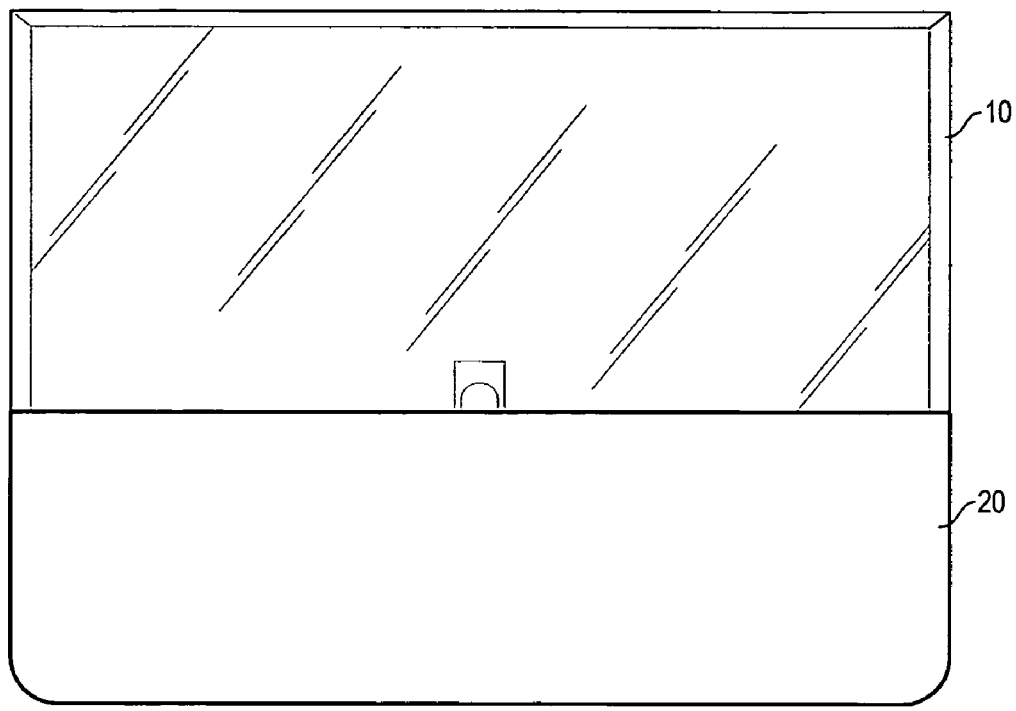
FIG. 4 is a front view of the badge.
Figure 5:
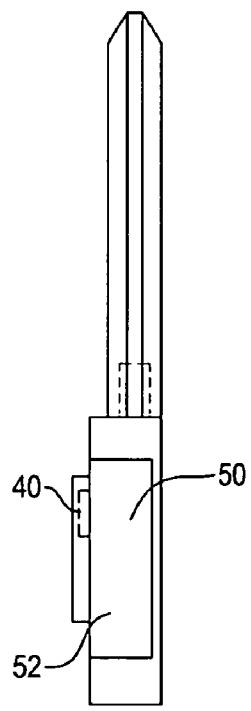
FIG. 5 is a side view of the badge.
Figure 6:
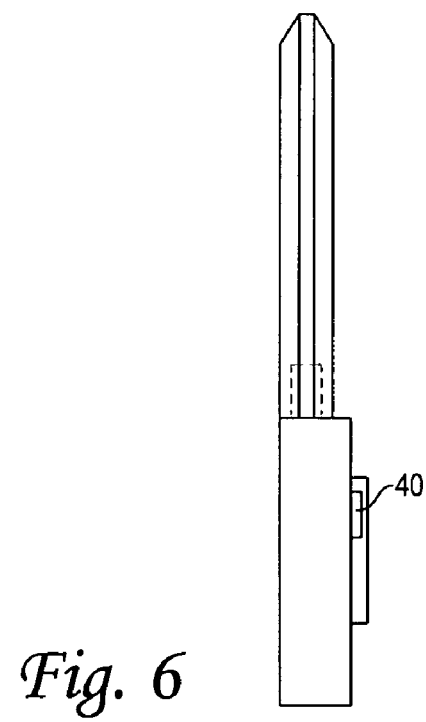
FIG. 6 is a side view of the badge.
Figure 7:
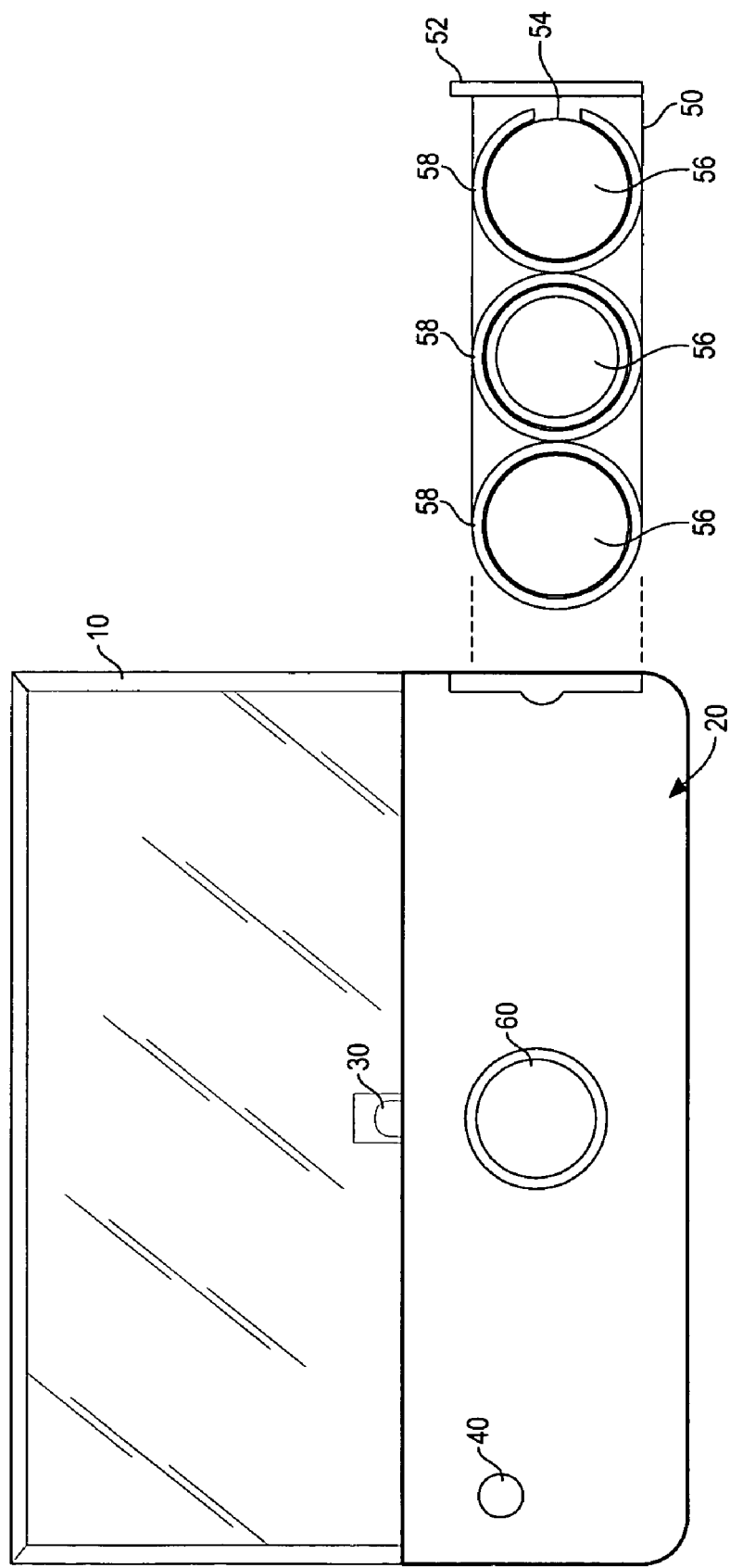
FIG. 7 is a rear view of the badge with the battery tray in open position.

10 Transparent Section
20 Compartment Section
30 LED
40 Button
50 Battery Tray
52 Battery Tray Handle
54 Bottom Groove
56 Button Batteries
58 Circular Recesses
60 First Magnet
62 Second Magnet

DETAILED DESCRIPTION OF THE PREFERRED EMBODIMENT

A flashing light badge has a transparent section 10 and a compartment section 20.

The compartment and transparent section has a front side and a backside. The front side or back side can receive printing or etching on the flat surface. The compartment backside faces toward a user when the user wears the light badge. The front side of the badge faces an observer who sees a preferably unadorned compartment front face.

The transparent section can be made of plastic. The plastic allows three-dimensional etching inside the plastic material. The etching inside the plastic transparent section allows visual confirmation of the image or design imprinted within the badge from a casual distance. The plastic allows two-dimensional surface etching as well. The surface of the plastic can be screen-printed.

The compartment section has an LED 30 protruding into the transparent section. The LED illuminates the transparent section. A microchip LED controller or circuit on a printed circuit board is in the compartment section and controls the illumination of the LED. A button 40 actuates the LED controller cycling between the various modes of illumination. The device has an off mode and an on mode. The on mode may allow continuous or intermittent illumination. The intermittent illumination can be a fast blink or a slow blink. Therefore, the controller circuit can provide four modes including an off mode, an on mode, and a fast and slow intermittent illumination mode.

The compartment stores a battery tray 50 in addition to the storage of the microchip. The battery tray preferably holds three button size batteries in linear configuration. A user may remove the battery tray by grasping the battery tray handle 52. The battery tray handle holds the three button batteries 56. The three button batteries are 1.5 V so that in series they form an electrical equivalent of a single battery having 4.5 V. A second battery in the middle and a third battery furthest away from the battery tray handle follows the first battery closest to the battery tray handle.

The tray is formed having a plurality of circular recesses 58, each receiving a single button battery. Electrical connections are made when the batteries slide into the compartment. The tray has a bottom groove 54 formed at the level of the bottom of the circular recess. The bottom groove exposes each battery bottom to an electrical contact when the tray is stowed in closed position. The groove forms a slot allowing a user to see through the tray when the batteries are removed. The slot allows an opening on the bottom side of the tray exposing but not allowing the batteries to drop out of the tray.

When the batteries are retained, the left and right third of the surface area of the bottom of the battery is supported and the middle third of the service area of the bottom of the battery is exposed. The top of the batteries is exposed allowing a user to dump the plurality of batteries for easy removal. The battery tray having no electrical contacts and made completely out of a single piece of plastic enables electrical contact in closed position energizing and completing a circuit.

The bottom tray groove is preferably in the middle of the tray running the length of the tray from the tray handle to the end opposite the tray handle. The button battery cell configuration is preferably alternating having a positive battery orientation facing up every other battery.

The exterior of the compartment section retains a magnet 60 affixed to the exterior. The magnet is placed on the backside of the compartment. Preferably, the first and second magnet is disk shaped. The first magnet can be glued onto the exterior of the compartment section.

The magnet attached to the compartment section is the first magnet. A second magnet 62 adheres to the first magnet by attraction. A user attaches the badge to clothing by inserting clothing between the first and second magnets. The second magnet is free and not attached to the first and can be removed by a user. The user may temporarily remove the second magnet and place clothing between the first and second magnet. The attraction between the magnets retains the badge on clothing.

The invention claimed is:

1. An illuminated badge comprising: a plastic transparent section having an LED illuminating the transparent section; a compartment section housing a controller circuit controlling LED illumination, a battery tray holding batteries and inserting into the compartment section from the side of the compartment section; a first magnet attached to the compartment section; and a second magnet adhering to the first magnet allowing a user to attach the badge to clothing by inserting clothing between the first and second magnets wherein a bottom groove is formed at the level of the bottom of the circular recess exposing each battery bottom to an electrical contact when the tray is stowed in closed position, wherein insertion of the battery tray into the compartment section activates electrical connection and energizes the circuit.

2. The illuminated badge of claim 1, wherein the battery tray has no electrical contacts.

3. The illuminated badge of claim 1, wherein the transparent portion displays screen-printing art.

4. The illuminated badge of claim 1, wherein the transparent portion displays three-dimensional laser etched art.

5. The illuminated badge of claim 1, wherein three button batteries are 1.5 V so that in series forming an electrical equivalent of a 4.5 V battery.

6. The illuminated badge of claim 1, further comprising a battery tray handle.

* * * * *